(12) United States Patent
Gale et al.

(10) Patent No.: US 11,784,841 B2
(45) Date of Patent: *Oct. 10, 2023

(54) PRESENTING PARTICIPANT REACTIONS WITHIN A VIRTUAL CONFERENCING SYSTEM

(71) Applicant: Snap Inc., Santa Monica, CA (US)

(72) Inventors: Maxwell Gale, New York, NY (US); Andrew Cheng-min Lin, Long Island City, NY (US); Walton Lin, Chatham, NJ (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/856,588

(22) Filed: Jul. 1, 2022

(65) Prior Publication Data

US 2022/0407735 A1 Dec. 22, 2022

Related U.S. Application Data

(63) Continuation of application No. 17/390,564, filed on Jul. 30, 2021, now Pat. No. 11,381,411.

(Continued)

(51) Int. Cl.
*G06F 15/16* (2006.01)
*H04L 12/18* (2006.01)
*H04L 65/4038* (2022.01)

(52) U.S. Cl.
CPC ...... *H04L 12/1831* (2013.01); *H04L 12/1822* (2013.01); *H04L 65/4038* (2013.01)

(58) Field of Classification Search
None
See application file for complete search history.

(56) References Cited

U.S. PATENT DOCUMENTS 10,979,672 B1 4/2021 Krol et al.
11,362,848 B1 6/2022 Lin et al.
(Continued)

FOREIGN PATENT DOCUMENTS

CN 111066042 A 4/2020
WO WO-2011137291 A2 * 11/2011 ........... G06F 3/0421
(Continued)

OTHER PUBLICATIONS

U.S. Appl. No. 17/390,564, U.S. Pat. No. 11,381,411, filed Jul. 30, 2021, Presenting Participant Reactions Within a Virtual Conferencing System.

(Continued)

*Primary Examiner* — Phyllis A Book
(74) *Attorney, Agent, or Firm* — Schwegman Lundberg & Woessner, P.A.

(57) ABSTRACT

Aspects of the present disclosure involve a system comprising a computer-readable storage medium storing a program and method for presenting participant reactions to a virtual conference. The program and method provide for a virtual conference between plural participants; provide, for each of the plural participants, display of a reaction button which is selectable by the participant to indicate a reaction to the virtual conference; receive indication of selections of the reaction button by one or more of the plural participants; and in response to receiving the indication, provide, for each of the plural participants, display of reaction icons and audio output based on the selections, determine that a rate at which the selections were received meets a threshold rate, and provide, in response to the determining, for modified audio output associated with the selections.

20 Claims, 11 Drawing Sheets

Related U.S. Application Data

(60) Provisional application No. 63/168,057, filed on Mar. 30, 2021.

(56) References Cited

U.S. PATENT DOCUMENTS

| | | | |
|---|---|---|---|
| 11,381,411 B1 | | 7/2022 | Gale et al. |
| 2011/0270921 A1* | | 11/2011 | Jones ............... H04L 65/1045 709/204 |
| 2012/0092438 A1 | | 4/2012 | Guzman et al. |
| 2012/0204118 A1 | | 8/2012 | Lefar et al. |
| 2013/0139193 A1 | | 5/2013 | Fan et al. |
| 2014/0229866 A1 | | 8/2014 | Gottlieb |
| 2015/0046533 A1* | | 2/2015 | Talloen ............... H04M 3/567 709/204 |
| 2016/0277708 A1 | | 9/2016 | Rintel et al. |
| 2018/0234471 A1 | | 8/2018 | Qian et al. |
| 2018/0279063 A1* | | 9/2018 | Sun ..................... H04S 7/302 |
| 2018/0330736 A1* | | 11/2018 | Faulkner ............. G10L 17/00 |
| 2018/0331842 A1 | | 11/2018 | Faulkner et al. |
| 2019/0124128 A1* | | 4/2019 | Bader-Natal ....... G06F 3/04842 |
| 2019/0023031 A1 | | 7/2019 | Faulkner |
| 2021/0058264 A1* | | 2/2021 | Fahrendorff ........ H04L 12/1822 |
| 2021/0096703 A1* | | 4/2021 | Anzu .................... H04N 7/147 |
| 2021/0117573 A1 | | 4/2021 | Lewbel et al. |
| 2021/0320811 A1* | | 10/2021 | Constantinides ... H04L 12/1831 |
| 2022/0321369 A1 | | 10/2022 | Lin et al. |
| 2022/0321371 A1 | | 10/2022 | Lin et al. |
| 2022/0321372 A1 | | 10/2022 | Cho et al. |
| 2022/0321373 A1 | | 10/2022 | Lin et al. |
| 2022/0321374 A1 | | 10/2022 | Lin et al. |
| 2022/0321375 A1 | | 10/2022 | Lin et al. |
| 2022/0321376 A1 | | 10/2022 | Lin et al. |
| 2022/0321613 A1 | | 10/2022 | Lin et al. |
| 2022/0321617 A1 | | 10/2022 | Gale et al. |
| 2022/0321832 A1 | | 10/2022 | Lin et al. |
| 2022/0321833 A1 | | 10/2022 | Lin et al. |
| 2022/0385490 A1 | | 12/2022 | Lin et al. |
| 2023/0032922 A1 | | 2/2023 | Lin et al. |
| 2023/0094963 A1 | | 3/2023 | Lin et al. |
| 2023/0095314 A1 | | 3/2023 | Lin et al. |
| 2023/0096597 A1 | | 3/2023 | Lin et al. |
| 2023/0101377 A1 | | 3/2023 | Lin et al. |
| 2023/0101879 A1 | | 3/2023 | Lin et al. |

FOREIGN PATENT DOCUMENTS

| | | |
|---|---|---|
| WO | WO-2016126813 A2 | 8/2016 |
| WO | WO-2022212386 A1 | 10/2022 |
| WO | WO-2022212391 A1 | 10/2022 |

OTHER PUBLICATIONS

U.S. Appl. No. 17/390,630, filed Jul. 30, 2021, Presenting Overview of Participant Reactions Within a Virtual Conferencing System.

"U.S. Appl. No. 17/390,564, Notice of Allowance dated Mar. 1, 2022", 10 pgs.

"U.S. Appl. No. 17/390,630, Final Office Action dated Sep. 8, 2022", 13 pgs.

"U.S. Appl. No. 17/390,630, Non Final Office Action dated Mar. 29, 2022", 12 pgs.

"U.S. Appl. No. 17/390,630, Notice of Allowance dated Mar. 7, 2023", 11 pgs.

"U.S. Appl. No. 17/390,630, Response filed Jul. 29, 2022 to Non Final Office Action dated Mar. 29, 2022", 9 pgs.

"U.S. Appl. No. 17/390,630, Response filed Dec. 8, 2022 to Final Office Action dated Sep. 8, 2022", 10 pgs.

"International Application Serial No. PCT/US2022/022360, International Search Report dated Jul. 12, 2022", 5 pgs.

"International Application Serial No. PCT/US2022/022360, Written Opinion dated Jul. 12, 2022", 9 pgs.

\* cited by examiner

PRESENTING PARTICIPANT REACTIONS WITHIN A VIRTUAL CONFERENCING SYSTEM

CROSS-REFERENCE TO RELATED APPLICATION

This patent application is a continuation of U.S. patent application Ser. No. 17/390,564, filed Jul. 30, 2021, which application claims the benefit of U.S. Provisional Patent Application No. 63/168,057, filed Mar. 30, 2021, entitled "PRESENTING PARTICIPANT REACTIONS WITHIN A VIRTUAL CONFERENCING SYSTEM", which are incorporated by reference herein in their entirety.

TECHNICAL FIELD

The present disclosure relates generally to virtual conferencing systems, including presenting participant reactions within a virtual conferencing system.

BACKGROUND

A virtual conferencing system provides for the reception and transmission of audio and video data between devices, for communication between device users in real-time.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

A virtual conferencing system provides for the reception and transmission of audio and video data between devices, for communication between device users in real-time. A virtual conferencing system may provide a reactions interface with different reaction buttons. Each reaction button is selectable by participants to indicate a respective reaction to the virtual conference.

Selection of a particular reaction button (e.g., an applause button, depicted as clapping hands) causes the virtual conferencing system to display a corresponding reaction icon (e.g., clapping hands) on the screen. For example, the clapping hands is presented at the bottom of the screen, and is animated to travel up the screen until disappearing after having traveled a predefined distance.

The clapping hands icon may be displayed each time the applause button is pressed. In addition, the virtual conferencing system may playback an audio file (e.g., a single clap sound) each time the applause button is pressed by any of the participants. In some cases, a growing number of presses with respect to the applause button indicates a growing applause by the participants.

The disclosed embodiments provide for modifying the audio output and/or display of reaction icons (e.g., clapping hands icon) in cases where that rate of presses for the reaction button (e.g., applause button) meets a threshold rate. For example, the modified audio is based on playback of an audio file that corresponding to a louder, more intense, applause. In another example, the modified display of reaction icons is based on supplemental reaction images suggesting increased applause and/or cheer.

Moreover, the disclosed embodiments further provide for generating a graphical overview of reactions by participants with respect to the recording of a virtual conference. For example, the graphical overview is depicted as a timeline which indicates at what times different reactions were submitted (e.g., by participants pressing respective reaction buttons). The virtual conferencing system may display the timeline to a presenter or other administrative user upon request.

By virtue of the foregoing, the virtual conferencing system provides for increased user engagement with respect to participating in a virtual conference, from either the role of a presenter or from the role of an attendee.

Figure 1:
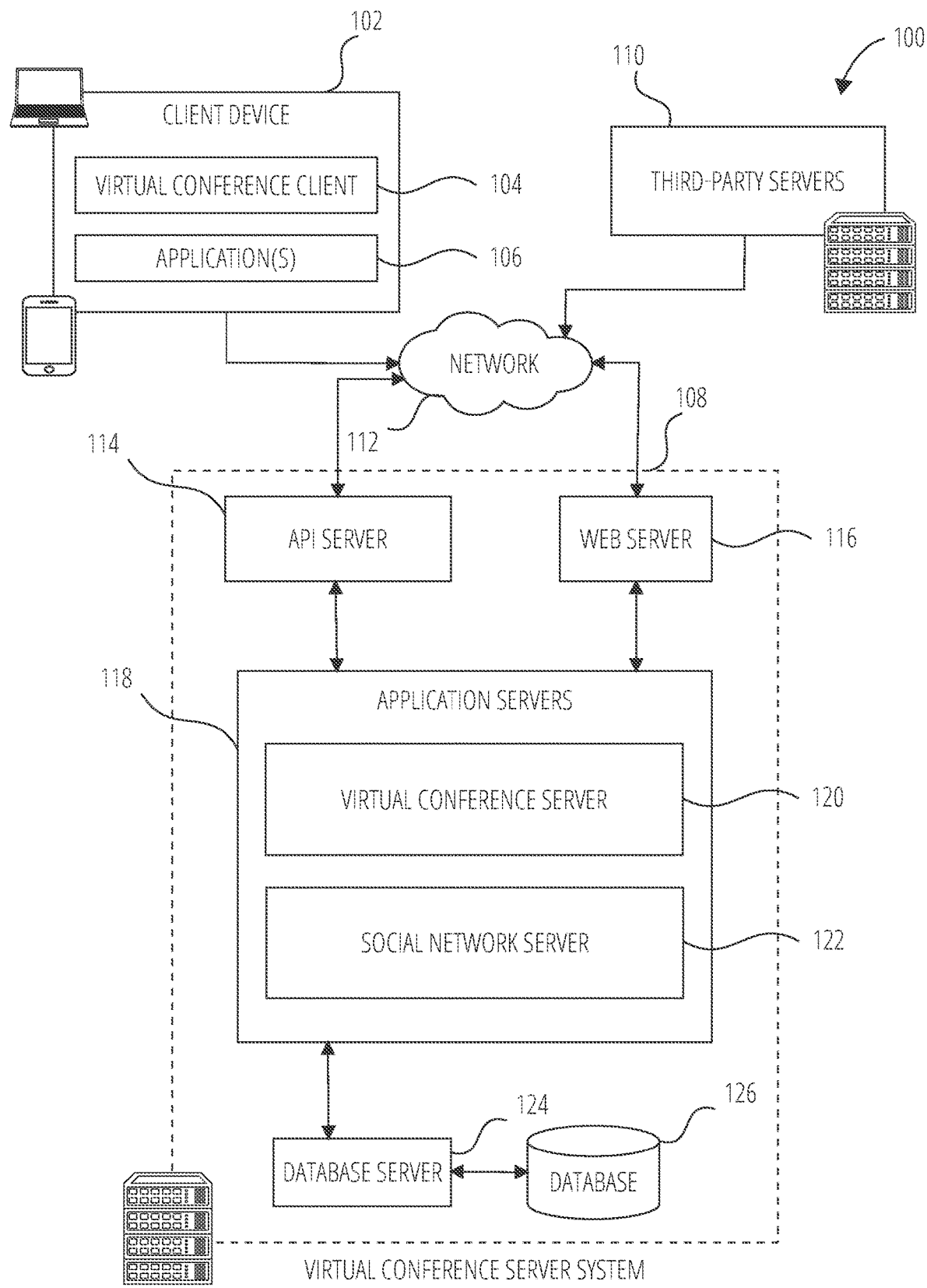
FIG. 1 is a diagrammatic representation of a networked environment in which the present disclosure may be deployed, in accordance with some examples.

FIG. 1 is a block diagram showing an example virtual conferencing system 100 for exchanging data over a network. The virtual conferencing system 100 includes multiple instances of a client device 102, each of which hosts a number of applications, including a virtual conference client 104 and other application(s) 106. Each virtual conference client 104 is communicatively coupled to other instances of the virtual conference client 104 (e.g., hosted on respective other client devices 102), a virtual conference server system 108 and third-party servers 110 via a network 112 (e.g., the Internet). A virtual conference client 104 can also communicate with locally-hosted applications 106 using Applications Program Interfaces (APIs).

The virtual conferencing system 100 provides for the reception and transmission of audio, video, image, text and/or other signals by user devices (e.g., at different locations), for communication between users in real-time. In some cases, two users may utilize virtual conferencing to communicate with each other in one-to-one communication at their respective devices. In other cases, multiway virtual conferencing may be utilized by more than two users to participate in a real-time, group conversation. Thus, multiple client devices 102 may participate in virtual conferencing, for example, with the client devices 102 participating in a group conversation in which audio-video content streams and/or message content (e.g., text, images) are transmitted between the participant devices.

A virtual conference client 104 is able to communicate and exchange data with other virtual conference clients 104 and with the virtual conference server system 108 via the network 112. The data exchanged between virtual conference clients 104, and between a virtual conference client 104 and the virtual conference server system 108, includes functions (e.g., commands to invoke functions) as well as payload data (e.g., video, audio, other multimedia data, text).

The virtual conference server system 108 provides server-side functionality via the network 112 to a particular virtual conference client 104. For example, with respect to transmitting audio and/or video streams, the virtual conference client 104 (e.g., installed on a first client device 102) may facilitate in transmitting streaming content to the virtual conference server system 108 for subsequent receipt by other participant devices (e.g., one or more second client devices 102) running respective instances of the virtual conference client 104.

The streaming content can correspond to audio and/or video content captured by sensors (e.g., microphones, video cameras) on the client devices 102, for example, corresponding to real-time video and/or audio capture of the users (e.g., faces) and/or other sights and sounds captured by the respective device. The streaming content may be supplemented with other audio/visual data (e.g., animations, overlays, emoticons and the like) and/or message content (e.g., text, stickers, emojis, other image/video data), for example, in conjunction with extension applications and/or widgets associated with the virtual conference client 104.

While certain functions of the virtual conferencing system 100 are described herein as being performed by either a virtual conference client 104 or by the virtual conference server system 108, the location of certain functionality either within the virtual conference client 104 or the virtual conference server system 108 may be a design choice. For example, it may be technically preferable to initially deploy certain technology and functionality within the virtual conference server system 108 but to later migrate this technology and functionality to the virtual conference client 104 where a client device 102 has sufficient processing capacity.

The virtual conference server system 108 supports various services and operations that are provided to the virtual conference client 104. Such operations include transmitting data to, receiving data from, and processing data generated by the virtual conference client 104. This data may include the above-mentioned streaming content and/or message content, client device information, and social network information, as examples. Data exchanges within the virtual conferencing system 100 are invoked and controlled through functions available via user interfaces (UIs) of the virtual conference client 104.

Turning now specifically to the virtual conference server system 108, an Application Program Interface (API) server 114 is coupled to, and provides a programmatic interface to, application servers 118. The application servers 118 are communicatively coupled to a database server 124, which facilitates access to a database 126 that stores data associated with virtual conference content processed by the application servers 118. Similarly, a web server 116 is coupled to the application servers 118, and provides web-based interfaces to the application servers 118. To this end, the web server 116 processes incoming network requests over the Hypertext Transfer Protocol (HTTP) and several other related protocols.

The Application Program Interface (API) server 114 receives and transmits virtual conference data (e.g., commands, audio/video payloads) between the client device 102 and the application servers 118. Specifically, the Application Program Interface (API) server 114 provides a set of interfaces (e.g., routines and protocols) that can be called or queried by the virtual conference client 104 in order to invoke functionality of the application servers 118. The Application Program Interface (API) server 114 exposes various functions supported by the application servers 118, including account registration, login functionality, the streaming of audio and/or video content, and/or the sending and retrieval of message content, via the application servers 118, from a particular virtual conference client 104 to another virtual conference client 104, the retrieval of a list of contacts of a user of a client device 102, the addition and deletion of users (e.g., contacts) to a user graph (e.g., a social graph), and opening an application event (e.g., relating to the virtual conference client 104).

The application servers 118 host a number of server applications and subsystems, including for example a virtual conference server 120 and a social network server 122. The virtual conference server 120 implements a number of virtual conference processing technologies and functions, particularly related to the aggregation and other processing of content (e.g., streaming content) included in audio-video feeds received from multiple instances of the virtual conference client 104. Other processor and memory intensive processing of data may also be performed server-side by the virtual conference server 120, in view of the hardware requirements for such processing.

Figure 3:
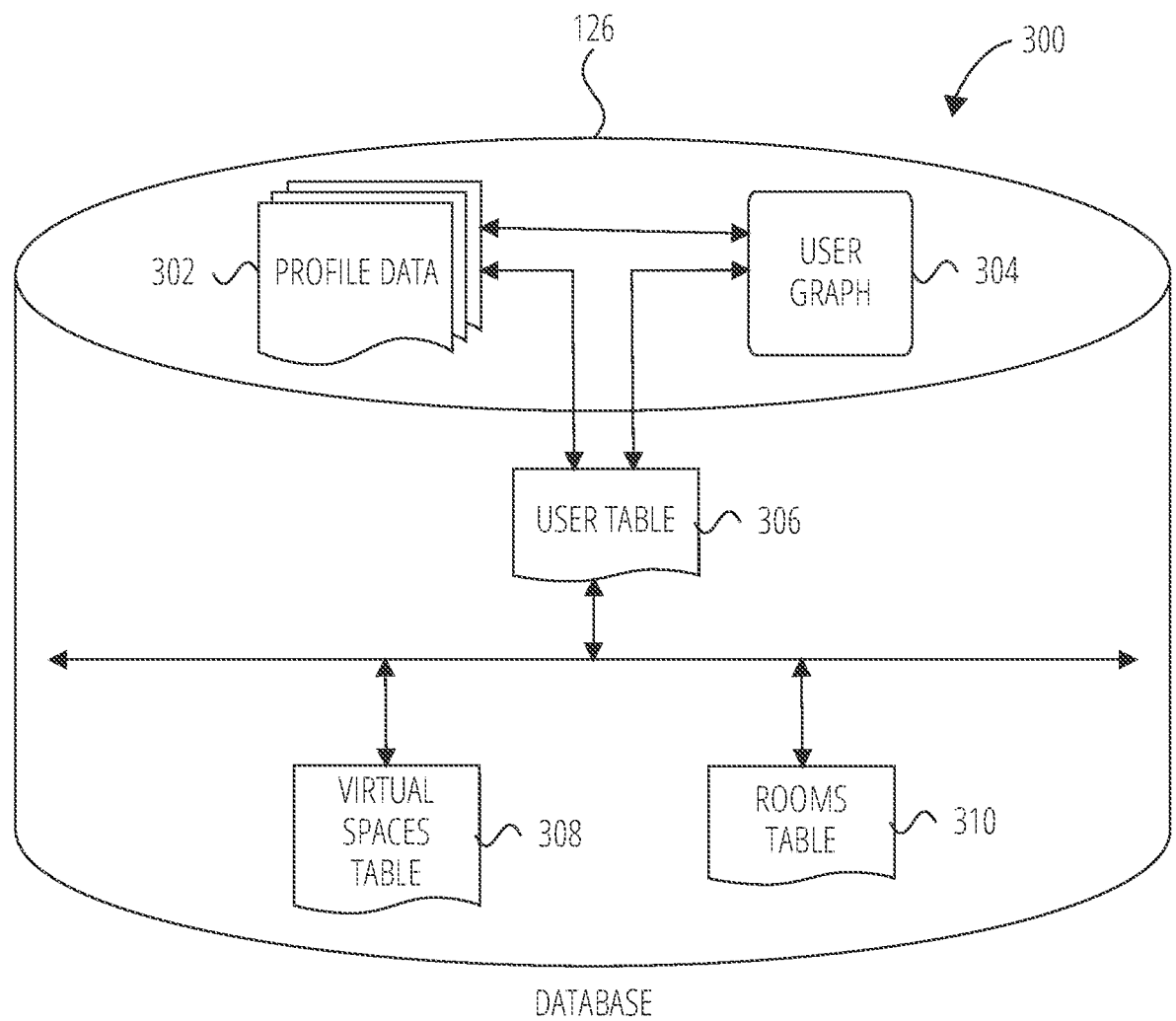
FIG. 3 is a diagrammatic representation of a data structure as maintained in a database, in accordance with some examples.

The social network server 122 supports various social networking functions and services and makes these functions and services available to the virtual conference server 120. To this end, the social network server 122 maintains and accesses a user graph 304 (as shown in FIG. 3) within the database 126. Examples of functions and services supported by the social network server 122 include the identification of other users of the virtual conferencing system 100 with which a particular user has relationships (e.g., contacts such as friends, colleagues, teachers, students, and the like).

In one or more embodiments, a user interacting via the virtual conference client 104 running on a first client device 102 may select and invite participant(s) to a virtual conference. For example, the participants may be selected from contacts maintained by the social network server 122. In another example, the participants may be selected from contacts included within a contact address book stored in association with the first client device 102 (e.g., in local memory or in a cloud-based user account). In another example, the participants may be selected by the user manually entering email addresses and/or phone numbers of the participants.

The user at the first client device 102 may initiate the virtual conference by selecting an appropriate user interface element provided by the virtual conference client 104, thereby prompting the invited participants, at their respective devices (e.g., one or more second client devices 102), to accept or decline participation in the virtual conference. When the participant(s) have accepted the invitation (e.g., via the prompt), the virtual conference server system 108 may perform an initialization procedure in which session information is published between the participant client devices 102, including the user who provided the invite. Each of the participant client devices 102 may provide respective session information to the virtual conference server system 108, which in turn publishes the session information to the other participant client devices 102. The session information for each client device 102 may include content stream(s) and/or message content that is made available by the client device 102, together with respective identifiers for the content stream(s) and/or message content.

As described below with respect to FIG. 2, the virtual conference may correspond to a virtual space which includes one or more rooms (e.g., virtual rooms). The virtual space and its corresponding rooms may have been created at least in part by the inviting user and/or by other users. In this manner, an end user may act as an administrator, who creates their own virtual spaces with rooms, and/or designs a virtual space based on preset available rooms.

Figure 2:
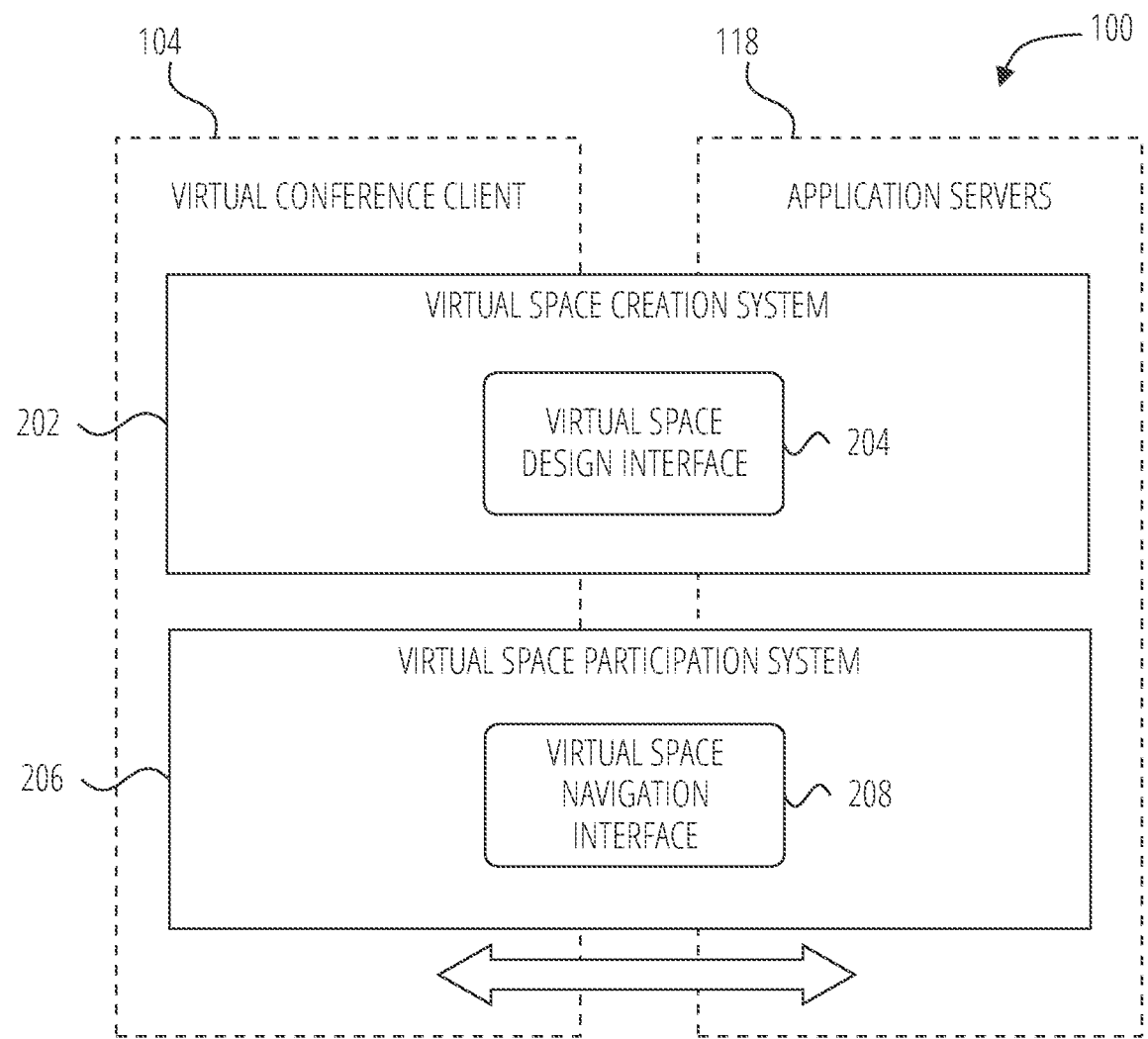
FIG. 2 is a diagrammatic representation of a virtual conferencing system, in accordance with some examples, that has both client-side and server-side functionality.

FIG. 2 is a block diagram illustrating further details regarding the virtual conferencing system 100, according to some examples. Specifically, the virtual conferencing system 100 is shown to comprise the virtual conference client 104 and the application servers 118. The virtual conferencing system 100 embodies a number of subsystems, which are supported on the client-side by the virtual conference client 104 and on the server-side by the application servers 118. These subsystems include, for example, a virtual space creation system 202 which implements a virtual space design interface 204, and a virtual space participation system 206 which implements a virtual space navigation interface 208.

The virtual space creation system 202 provides for a user to design one or more virtual space(s) in which participants may engage in virtual conferencing. In one or more embodiments, a virtual space corresponds to an environment with one or more rooms configured to accommodate virtual conferencing.

The virtual space may be created and/or selected (e.g., from among a set of predefined virtual spaces with rooms) by an end user who wishes to invite other users for virtual conferencing. In addition, the individual rooms of a virtual space may be newly-created and/or selected (e.g., from among a set of predefined rooms) by the end user. In one or more embodiments, the virtual space creation system 202 includes a virtual space design interface 204, which is usable by the end user to design a virtual space, including creating and/or selecting rooms for including in the virtual space.

As discussed below with respect to FIG. 4, the virtual space design interface 204 enables an end user (e.g., acting as an administrator) to select and/or position multiple elements within in a room. Examples of elements include, but are not limited to, participant video elements (e.g., for displaying the respective video feeds of participants), chat interfaces (e.g., for participants to provide text-based messages, stickers and/or reactions within a room), breakout buttons (e.g., for shuffling from a first room to one or more second rooms), and/or other user-definable elements for performing certain actions (e.g., speaking into a virtual microphone, querying an administrator via a button, and the like).

The virtual space participation system 206 is configured to perform virtual conferencing among participants within a virtual space. The participants may include the end user (e.g., administrator) who created the virtual space, as well as those users who were invited to participate in virtual conferencing with respect to the virtual space created/selected by the end user. The virtual space participation system 206 includes a virtual space navigation interface 208 (e.g., discussed below with respect to FIG. 5) that allows participants to navigate between the rooms of a virtual space, and to participate in virtual conferencing with respect to the rooms.

In one or more embodiments, the virtual space creation system 202 and the virtual space participation system 206 provide for an end user (e.g., an administrator) to create different types of environments (e.g., virtual spaces with rooms) for virtual conferencing, and for participants to engage in virtual conferencing within such environments. Examples of such virtual conferencing include, but are not limited to: business meetings, seminars, presentations, classroom lectures, teacher office hours, concerts, reunions, virtual dinners, escape rooms, and the like.

FIG. 3 is a schematic diagram illustrating data structures 300, which may be stored in the database 126 of the virtual conference server system 108, according to certain examples. While the content of the database 126 is shown to comprise a number of tables, it will be appreciated that the data could be stored in other types of data structures (e.g., as an object-oriented database).

The database 126 includes profile data 302, a user graph 304 and a user table 306 relating to the users (participants) of the virtual conferencing system 100. The user table 306 stores user data, and is linked (e.g., referentially) to the user graph 304 and the profile data 302. Each user of the virtual conferencing system 100 is associated with a unique identifier (email address, telephone number, social network identifier, etc.).

The user graph 304 stores (e.g., in conjunction with the social network server 122) information regarding relationships and associations between users. Such relationships may be social, professional (e.g., work at a common corporation or organization) interested-based or activity-based, merely for example. As noted above, the user graph 304 may be maintained and accessed at least in part by the social network server 122.

The profile data 302 stores multiple types of profile data about a particular user. The profile data 302 may be selectively used and presented to other users of the virtual conferencing system 100, based on privacy settings specified by a particular user. The profile data 302 includes, for example, a user name, telephone number, email address, and/or settings (e.g., notification and privacy settings), as well as a user-selected avatar representation.

The database 126 further includes a virtual spaces table 308. As noted above, a virtual space corresponds to an environment with one or more rooms configured to accommodate virtual conferencing. A virtual space may be newly-created by a user, or may be included within one or more sets of public virtual spaces made available (e.g., by other users, system administrators, and the like) for virtual conferencing. The virtual spaces table 308 stores information representing the one or more sets of public virtual spaces, as well as any private virtual space(s) created by a user (e.g., in a case where the particular user did not make such virtual space(s) public).

In one or more embodiments, the virtual spaces table 308 stores associations between its virtual spaces and users (e.g., within the user table 306) who selected those virtual spaces. In this manner, it is possible for a particular user to have one or more virtual spaces associated therewith. Moreover, the database 126 includes a rooms table 310 which may be associated with the virtual spaces within the virtual spaces table 308. As noted above, a room may be newly-created by a user, or may be included within one or more sets (e.g., galleries) of public rooms made available for user selection. The rooms table 310 stores information representing the one or more sets of rooms, as well as any private room(s) created by the user (e.g., in a case where the particular user did not make such room(s) public). The stored information is usable by the virtual conferencing system 100 to create the corresponding rooms for use in a virtual space. In one or more embodiments, the stored information may further include recordings (e.g., audio and/or video recordings) of a particular virtual conference, for subsequent playback by corresponding participants.

Figure 4:
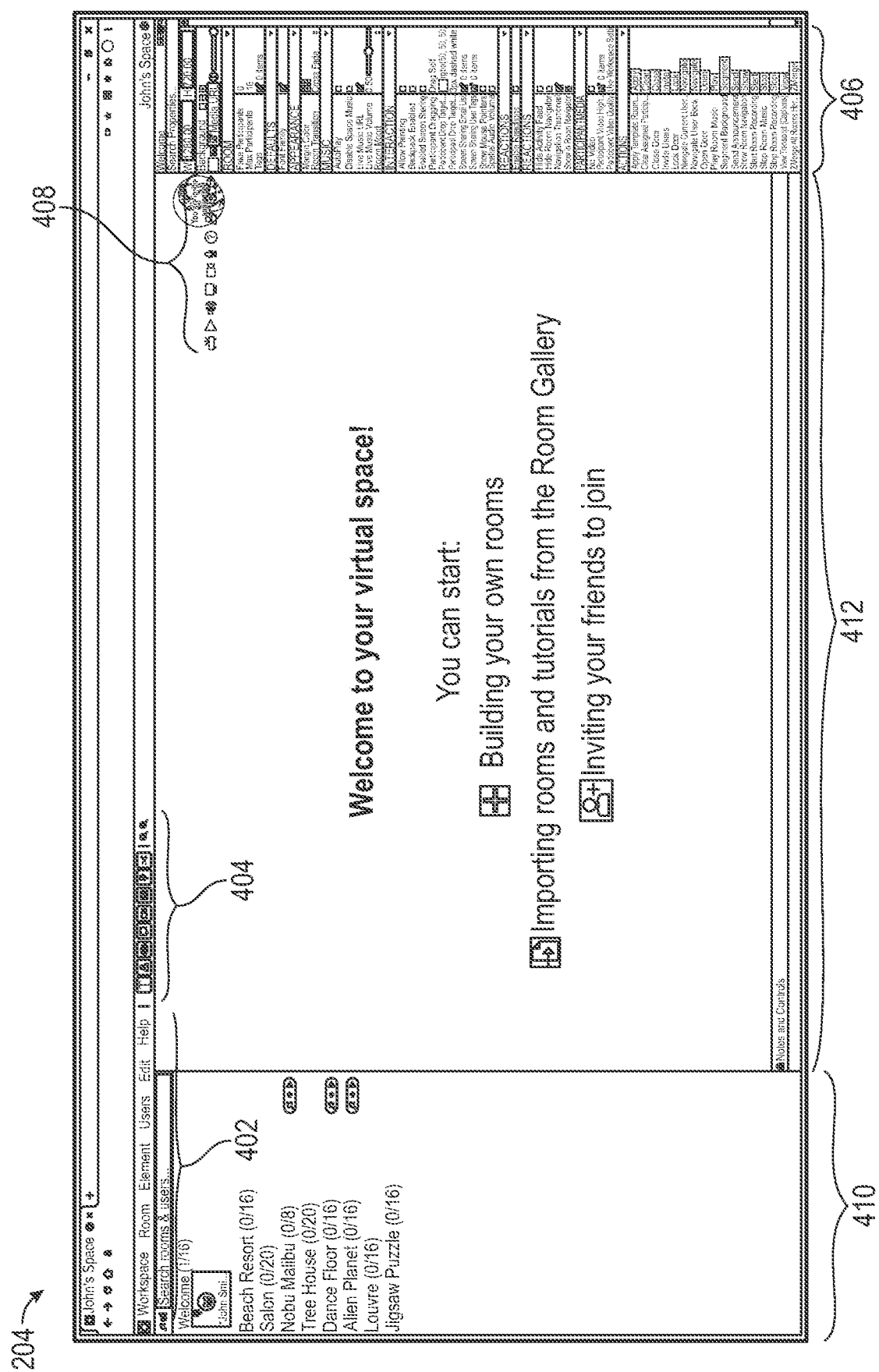
FIG. 4 illustrates a virtual space design interface with interface elements for designing a virtual space, in accordance with some example embodiments.

FIG. 4 illustrates a virtual space design interface 204 with interface elements for designing a virtual space, in accordance with some example embodiments. Designing the virtual space may include creation and/or selection of rooms for including in the virtual space. The virtual space design interface 204 includes a menu interface 402, a room elements interface 404, an element properties interface 406, a controls interface 408, a room list interface 410, a room canvas interface 412, and an administrator name 414. It is noted that elements 402-414 correspond to an example of interface elements for the virtual space design interface 204, and that additional, fewer and/or different interface elements may be used.

An administrator (e.g., corresponding to administrator name 414) may use the various interface elements to design a virtual space. In one or more embodiments, the menu interface 402 includes user-selectable categories (e.g., menu headings) relating to a virtual space (e.g., "workspace"), rooms within the virtual space, and/or elements within a room. For example, the workspace category is user-selectable for presenting options (e.g., via a drop-down list) to manage settings for the virtual space, manage invites for the virtual space, manage versions of a virtual space, publish the virtual space (e.g., for future use by users), manage virtual space publications, and/or to start/manage recordings (e.g., audio and/or video recordings) with respect to the virtual space.

The room category of the menu interface 402 is user-selectable for presenting options (e.g., via a drop-down list) to manage settings for a room within the virtual space, set a room background, set an order for the rooms listed in the room list interface 410, create a new room, import a room from a set of available rooms, remove a room, publish a room, manage room publications, and/or to start/manage recordings with respect to a room.

In addition, the element category is user-selectable for presenting options (e.g., via a drop-down list) to insert elements into a room, insert shapes into a room, foreground/background elements, arrange/position elements, and/or group elements. Examples of elements include, but are not limited to: an action button, analog clock, audience question board, backpack item, breakout button, chat, closed caption display, closed caption input, countdown, clock, digital clock, doorbell, double-sided image, feedback, image, multiuser video chat, music, participant audio mixer, participant count, participant video, picture strip, poll, random source, room preview, scheduled time, sound effect, stopwatch, take picture, text, timer, user search, video, waiting list, web media, website. Examples of shapes include, but are not limited to, a circle, rectangle and triangle.

The users category of the menu interface 402 is user-selectable for presenting options (e.g., via a drop-down list) to manage users/participants of the virtual space (e.g., adding tags for participants, so as to distinguish between roles such as an administrator or an attendee/participant). In addition, the edit category is user-selectable for performing edit operations (e.g., undo, redo, cut, copy, paste), and the help category is user-selectable for performing help operations (e.g., getting started, discord, live help, submitting feedback).

In one or more embodiments, the room elements interface 404 includes user-selectable icons for inserting elements (e.g., corresponding to a subset of those available via the above-mentioned element category) into a current room. For example, the elements may be added and/or positioned within the current room by selecting the element and dragging the selected element onto the room canvas interface 412, which represents the layout of the current room.

In one or more embodiments, the room elements interface 404 include icons including but not limited to: a text icon for adding text to a room; a participant video icon for adding a single participant video element (e.g., an interface element which is selectable by a single participant for displaying that participant's video feed) to a room; a multiuser video icon for adding a multiple participant video element (e.g., an interface element which is selectable by one or more participants for displaying the video feeds for those participants) to a room; a chat icon for adding a chat interface (e.g., for messaging using text, stickers, emojis, etc.) to a room; a video playback icon for adding a video playback element (e.g., screen) to a room for playback of a selected video; a background icon for selecting a background color/gradient, image or video to a room; an action icon for adding an action element (e.g., button) to a room for performing a user-defined action (e.g., speaking into a virtual microphone, querying an administrator via a button, and the like); and/or a breakout button for adding a breakout element (e.g., button) for shuffling selected participants between the current room and one or more other rooms.

In one or more embodiments, the element properties interface 406 include various fields for setting configuration properties for above-described room elements. For example, with respect to elements in general (e.g., text, single participant video element, multi participant video element, chat interface, video element, background image, action element, breakout button), the element properties interface 406 includes fields for setting the element title/name, opacity, gradient, style, layout, borders/corners, shadows, interaction (e.g., to what extent participant(s) may delete, modify, resize the element), filtering, full screen status, conditions, accessibility and actions for the element. For the single participant video element, the element properties interface 406 includes further fields for setting the manner in which users are placed into the single participant video element during virtual conferencing (e.g., automatically, manually by the participant and/or the administrator end user). In addition, for the chat interface, the element properties interface 406 includes further properties for setting who (e.g., administrator and/or participants) can provide chat input, and/or which types of input (e.g., text, stickers, emojis, etc.) are available. For the action element, the element properties interface 406 includes further properties for setting what type of action is to be performed in response to user selection of the action element (e.g., button). Moreover, for the breakout element, the element properties interface 406 includes further properties for selecting participants and/or breakout rooms.

In one or more embodiments, the element properties interface 406 further includes fields for setting configuration properties for the room canvas interface 412. For example, the element properties interface 406 includes fields for selecting a number of fake participants (e.g., simulated video feeds) in order to visualize multiple users, selecting music (e.g., background music), and/or selecting reaction buttons for participants to indicate real-time reactions with respect to virtual conferencing within a room.

In one or more embodiments, the controls interface 408 includes user-selectable icons corresponding to controls (e.g., administrative controls) for the virtual space. For example, the controls interface 408 include icons including but not limited to: a director mode icon for toggling between a director mode for designing a room and a user mode for viewing the room within the virtual space design interface 204 (e.g., with the director mode including the room elements interface 404 and the element properties interface 406 while the user mode does not); a view icon for viewing the room within the virtual space navigation interface 208; a share screen icon (e.g., for collaborative design with other user(s) such as co-administrators); a microphone icon for enabling or disabling the microphone; a help icon (e.g., getting started, discord, live help, submitting feedback); an invite icon (e.g., for displaying an invite link for sending to participants to visit the virtual space); a settings icon (e.g., for selecting the end user's video and audio devices for the virtual conferencing, and for selecting a user avatar); and/or an exit icon for exiting the virtual space design interface 204.

In one or more embodiments, the room list interface 410 displays the list of rooms for the virtual space. Each listed room is user selectable to switch to edit (e.g., in director mode) and/or view (e.g., in user mode) the selected room. As noted above, the list of rooms may be modified (e.g., by adding, importing and/or removing rooms) via the options within the room category of the menu interface 402.

Figure 5:
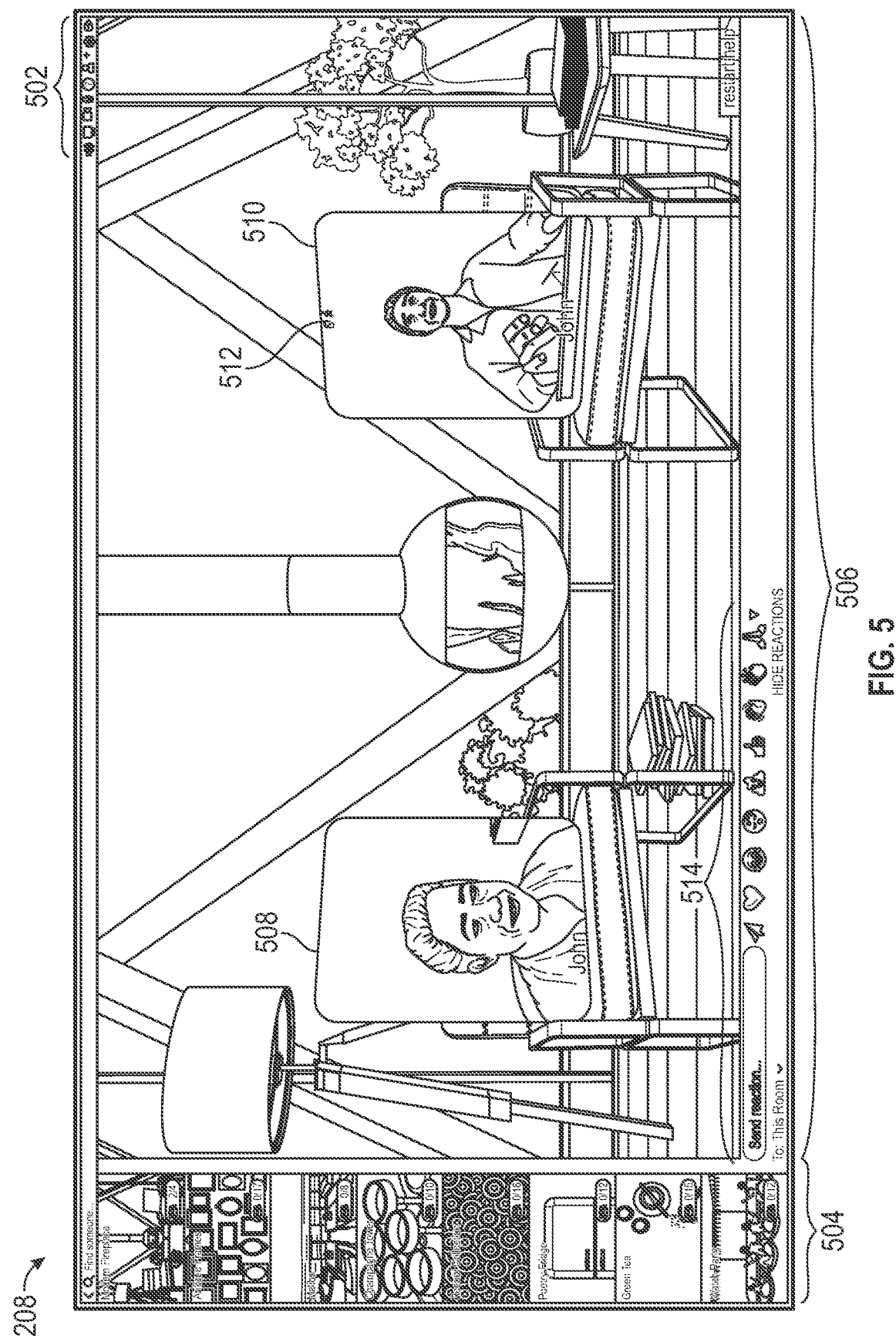
FIG. 5 illustrates a virtual space navigation interface with interface elements to navigate between the rooms of a virtual space and to participate in virtual conferencing with respect to the rooms, in accordance with some example embodiments.

FIG. 5 illustrates a virtual space navigation interface 208 with interface elements to navigate between the rooms of a virtual space and to participate in virtual conferencing with respect to the rooms, in accordance with some example embodiments. The virtual space navigation interface 208 includes a controls interface 502, a room list interface 504, a current room interface 506, a participant video element 508 and a participant video element 510. It is noted that elements 502-514 correspond to an example of interface elements for the virtual space navigation interface 208, and that additional, fewer and/or different interface elements may be used.

In one or more embodiments, the controls interface 502 includes user-selectable icons corresponding to controls (e.g., administrative controls) for the virtual space. For example, the controls interface 408 include icons including but not limited to: an edit icon for redirecting to the virtual space design interface 204 to edit the current room; a volume icon for adjusting a volume level for the current room; a share screen icon (e.g., for allowing others to view the room without necessarily joining the room); a microphone icon for muting and unmuting the microphone; a help icon (e.g., getting started, discord, live help, submitting feedback); an invite icon (e.g., for displaying an invite link for participants to visit the virtual space); a settings icon (e.g., for selecting the end user's video and audio devices for the virtual conferencing, and for selecting a user avatar); and/or an exit icon for exiting the virtual space design interface 204.

In one or more embodiments, the room list interface 504 displays the list of rooms for the virtual space. Each listed room is user selectable to switch to the selected room (e.g., for virtual conferencing). The selected room is presented as a current room within the current room interface 506. In this manner, a participant may navigate among the multiple rooms available within the virtual space. Alternatively or in addition, navigation between rooms is possible via a virtual space map interface (not shown) which depicts a map view of the virtual space (e.g., a floor plan) and its corresponding rooms, with each room being user selectable to navigate thereto. Alternatively or in addition, navigation between rooms is further possible by positioning a navigation button (not shown) within a room, where user selection of the button results in navigating to another room (e.g., a predefined room). As noted above, the virtual space design interface 204 allows for the design of a virtual space and its corresponding rooms. As such, navigation between rooms is based at least in part on the design of the virtual space (e.g., a virtual space may include one or more of the above-mentioned room list interface 504, the virtual space map/floor plan interface and/or the navigation button).

With respect to the current room interface 506, each participant is represented as a respective participant video element. As noted above, a participant video element corresponds to an interface element (e.g., a box) which is selectable by a single participant for displaying that participant's video feed. The example of FIG. 5 includes a first participant associated with the participant video element 508 and a second participant associated with the participant video element 510. In one or more embodiments, with respect to the perspective of the first participant, the participant video element 510 showing the feed of the second participant may include participant button(s) 512. For example, the participant button(s) 512 are selectable by the first participant so as to perform a predefined action (e.g., initiate a side conversation, designate the second participant to follow the first participant when the first participant moves rooms) with respect to the second participant.

As noted above, the element properties interface 406 of FIG. 4 may include fields for selecting reaction buttons for participants, to indicate real-time reactions with respect to virtual conferencing within a room. The example of FIG. 5 includes a reactions interface 514 with user-selectable elements to present inputted text, and icons (e.g., reaction buttons) for indicating different types of reactions/sentiments. Examples of such reactions include but are not limited to: love/happiness (e.g., heart button), laughing (e.g., laughing face button), boredom (e.g., sleeping face button), disagreement (e.g., thumbs down button, not shown), agreement (e.g., thumbs up or high five icon), applause (e.g., applause button depicted as clapping hands), and praising/expressing gratitude (e.g., praying hands icon).

While the example of FIG. 5 illustrates two participants, it is possible for the current room interface 506 to accommodate additional participants for virtual conferencing. The additional participants may be positioned (e.g., automatically and/or manually by dragging) based on the positioning of participant video elements (e.g., boxes) as designed by the virtual space design interface 204.

In one or more embodiments, the virtual space navigation interface 208 may vary based on whether a given participant is an administrator or another participant (e.g., an attendee). For example, some participant video elements may be designated (e.g., via the virtual space design interface 204) for administrators, while other participant video elements are designated for other participants. The virtual conference server system 108 is configured to distinguish between these administrator or other participant roles, for example, based on the above-described tags assigned to participants via the users category of the menu interface 402 provided by the virtual space design interface 204.

Figure 6:
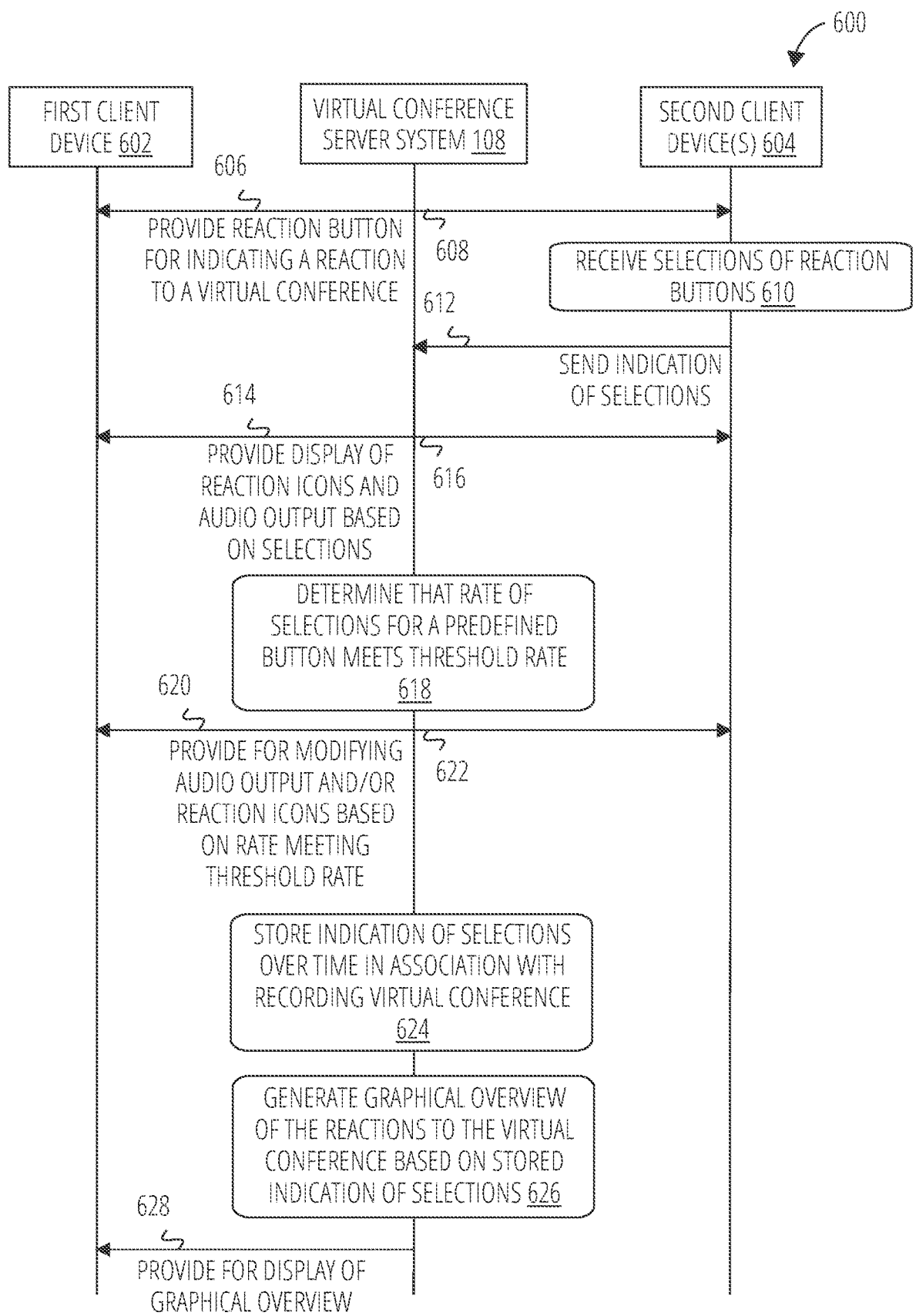
FIG. 6 is an interaction diagram illustrating a process for presenting participant reactions and a graphical overview of those participant reactions within a virtual conferencing system, in accordance with some example embodiments.

FIG. 6 is an interaction diagram illustrating a process 600 for presenting participant reactions and a graphical overview of those participant reactions within a virtual conferencing system, in accordance with some example embodiments. For explanatory purposes, the process 600 is described herein with reference to a first client device 602, one or more second client device(s) 604, and the virtual conference server system 108. Each of the first client device 602 and the second client device(s) 604 may correspond to a respective client device 102. The process 600 is not limited to the first client device 602, the second client device(s) 604 and the virtual conference server system 108. Moreover, one or more blocks (or operations) of the process 600 may be performed by one or more other components of the first client device 602, the second client device(s) 604 or the virtual conference server system 108, and/or by other suitable devices. Further for explanatory purposes, the blocks (or operations) of the process 600 are described herein as occurring in serial, or linearly. However, multiple blocks (or operations) of the process 600 may occur in parallel or concurrently. In addition, the blocks (or operations) of the process 600 need not be performed in the order shown and/or one or more blocks (or operations) of the process 600 need not be performed and/or can be replaced by other operations. The process 600 may be terminated when its operations are completed. In addition, the process 600 may correspond to a method, a procedure, an algorithm, etc.

Each of the first client device 602 and the second client device(s) 604 have instances of the virtual conference client 104 installed thereon. In the example of FIG. 6, the first client device 602 and the one or more second client device(s) 604 are associated with a respective first participant and respective one or more second participant(s) of the virtual conference server system 108. For example, the first participant may be associated with a first user account of the virtual conference server system 108, and the second participant(s) may be associated with second user account(s) of the virtual conference server system 108. In one or more embodiments, the first participant corresponds to an administrator (e.g., presenter, teacher, etc.) of the virtual conference, and the second participants correspond to attendees (e.g., guests, students, or other types of attendees) of the virtual conference.

As noted above, the first participant and second participant(s) are identifiable by the virtual conference server system 108 based on unique identifiers (e.g., email addresses, telephone numbers) associated with respective user accounts for the first participant and second participant(s). In one or more embodiments, the virtual conference server system 108 implements and/or works in conjunction with a social network server 122 which is configured to identify contacts with which a particular user has relationships. For example, the first participant and second participant(s) may be contacts with respect to the virtual conference server system 108.

As described herein with respect to operations 606-622, the virtual conferencing system 100 provides for modifying the audio output associated with participant-based reactions during a virtual conference, based on the rate at which the reactions are received from participants. With respect to operations 624-628, the virtual conferencing system 100 further provides for generating and displaying a graphical overview (e.g., timeline interface) of participant-based reactions to the virtual conference, for viewing by an administrator of the virtual conference.

At operations 606-608, the virtual conference server system 108 provides for real-time communication between the participant devices, which include the first client device 602 (e.g., corresponding to an administrator and/or presenter) and the one or more second client device(s) 604 (e.g., corresponding to remaining participants, such as attendee(s)). As noted above, the virtual conference server system 108 provides for receiving and transmitting of data between the participating devices, including one or more of audio, video, image, text and/or other signals. The real-time communication may occur within a room of plural rooms, the plural rooms being included within a virtual space.

In addition, the virtual space navigation interface 208 provides one or more user-selectable reaction buttons (e.g., via the reactions interface 514) for indicating different reactions to a virtual conference. Moreover, each participant may be represented by a respective participant video element (e.g., elements 508-510 in FIG. 5, corresponding to respective video feeds).

The second client device(s) 604 receives selections (e.g., button presses) of reaction buttons (block 610). In a first example, the selections correspond to input received from multiple participants. In another example, the selections correspond to input received from a single participant, where the single participant selects reaction button(s) multiple times. In yet another example, the selections corresponding to a combination of input received from multiple participants and multiple selections received from a single participant. In one or more embodiments, different reaction buttons (e.g., heart button, laugh button, sleep button, thumbs up button, high five button, applause button, praying button) may have been selected by the participant(s), to indicate respective reactions (e.g., love/happiness, laughing, sleep/boredom, agreement, congratulations, applause, and praising) to the virtual conference.

The second client device(s) 604 sends an indication of the selections to the virtual conference server system 108 (operation 612). In response, the virtual conference server system 108 provides for display of reaction icons and for audio output based on the selections, to each of the first client device 602 (operation 614) and second client device(s) 604 (operation 616).

In one or more embodiments, the displayed reaction icons use the same images as those of the reaction buttons. For example, a single selection of the heart button (e.g., via the reactions interface 514 on one of the second client device(s) 604) causes the virtual conference server system 108 to display a single instance of the heart icon (e.g., within the current room interface 506) on all participant devices (e.g., the first client device 602 and second client device(s) 604). In another example, two selections of the thumbs up button (e.g., via the reactions interface 514 from one of the second client device(s) 604) causes the virtual conference server system 108 to display two instances of the thumbs up icon on all participant devices. In yet another example, five selections of the applause button (e.g., from a combination of multiple second client device(s) 604) causes the virtual conference server system 108 to display five instances of the applause icon (e.g., clapping hands) on all participant devices.

As discussed below further with respect to FIG. 7, each reaction icon may be displayed as an animation. For example, each reaction icon is presented as starting from a bottom edge of the screen (e.g., with different icons starting at different random positions along the bottom edge), traveling/floating upwards for a predefined distance from the bottom edge, and disappearing after traveling the predefined distance.

With respect to the audio output provided at operations 614-616, one or more of the reaction buttons may be associated with a respective audio file. In this manner, the one or more reaction buttons are predefined to be associated with audio output (e.g., as being associated with an audio file), while the remaining reaction buttons are not be associated with audio output (e.g., as not being associated with an audio file). In response to each selection (e.g., each button press) for a predefined button, the virtual conference server system 108 causes playback of the respective audio file. For example, the applause button may be associated with an audio file corresponding to a single clap sound. Each selection (e.g., press) of the reaction button for the applause button by the second client device(s) 604 causes the virtual conference server system 108 to play the audio file for each of the participant devices.

In one or more embodiments, the virtual conference server system 108 is configured to determine, for a button predefined to be associated with audio output (e.g., applause button), the rate at which the button is selected/pressed. For example, for a given time period (e.g., 5 seconds starting from a given press of the predefined button), the virtual conference server system 108 calculates the rate based on the number of times that the predefined button is pressed during the time period.

Moreover, the virtual conference server system 108 may store (e.g., in the database 126) different threshold values representing different tiers for modified audio output. For example, each threshold value may correspond to a different tier of intensity for modifying the audio output associated with the predefined button. In addition, each threshold value may be associated with an audio file which represents the respective tier. Using the example of applause, the applause button may be associated with a first threshold rate (e.g., 10 total presses via one or more of the second client device(s) 604 within 5 seconds) for playing a first modified audio file, and with a second threshold rate (e.g., 25 total presses via the second client device(s) 604 within 10 seconds) for playing a second modified audio file. The first modified audio file may correspond with the sound of light applause, and the second audio file may correspond with the sound of heavier applause.

In the example of FIG. 6, the virtual conference server system 108 determines that the rate of selections for a predefined button (e.g., the applause button) meets at least the first threshold rate (block 618). In response, the virtual conference server system 108 provides for modifying the audio output and/or the reaction icons based on meeting the threshold rate (operations 620-622). For example, in a case where the calculated rate meets the first threshold rate but not the second threshold rate, the virtual conference server system 108 provides for playback of the first modified audio file corresponding to light applause. In another example, in a case where the calculated rate meets the second threshold rate, the virtual conference server system 108 may first provide playback of the first modified audio file upon meeting the first threshold rate, and then provide playback of the second modified audio file upon meeting the second threshold rate. In this manner, each of the participants (e.g., at the first client device 602 and the second client device(s) 604) may be presented with audio output in the following order: multiple instances of the single clap audio file, single playback of the first modified audio file (e.g., light applause), and single playback of the second modified audio file (e.g., heavier applause). Such playback of audio may create the perception of increased applause intensity as the number of button presses for the applause button increases to meet the first and second threshold rates.

With respect to modifying the reaction icons, the virtual conference server system 108 may further associate supplemental reaction images (e.g., first and second supplemental images) with respective tiers of intensity. Thus, in a case where the calculated rate meets the first threshold rate but not the second threshold rate, the virtual conference server system 108 provides for display of a first supplemental image (e.g., an animation such as a light confetti effect, fireworks, etc.). In another example, in a case where the calculated rate meets the second threshold rate, the virtual conference server system 108 first provides display of the first supplemental image upon meeting the first threshold rate, and then provides display of a second supplemental image (e.g., a heavier confetti effect, more intense fireworks) upon meeting the second threshold rate. For example, the supplemental images may be synchronized with the increased audio intensity described above.

As noted above, operations 624-628 relate to generating and displaying a graphical overview (e.g., timeline interface) of participant-based reactions to the virtual conference. At block 624, the virtual conference server system 108 stores an indication of the selections (e.g., the button presses from block 610) over time, in association with recording the virtual conference (block 624).

As noted above, a room may be designed via the virtual space design interface 204 for recording of a virtual conference. An administrator (e.g., presenter, teacher, etc.) may start/manage recordings (e.g., a classroom session) for a room via the virtual space design interface 204. The recordings may include video and/or audio, and may be stored in association with the rooms table 310. The virtual space navigation interface 208 may provide interface elements for the participants, including the administrator (e.g., teacher, presenter) and the other participants (e.g., students, attendees), to access the recordings.

With respect to block 624, the virtual conference server system 108 is configured to store an indication of each reaction button press together with a timestamp. For example, in sending the indication of selections at operation 612, the second client device(s) 604 may include an identifier for the reaction button together with a timestamp (e.g., a time relative to the beginning of the recording) at which the reaction button was pressed. The virtual conference server system 108 stores these reaction button-timestamp pairs within the rooms table 310 in association with the recording for the room. Thus, upon completion/termination of a virtual conference, the stored reaction button-timestamp pairs may correspond to a history of all reactions (e.g., via the reactions interface 514 of the participant devices) during that virtual conference.

Based the stored reaction button-timestamp pairs, the virtual conference server system 108 generates a graphical overview of the reactions to the virtual conference (block 626). In one or more embodiments, the graphical overview is generated as a timeline which indicates different reactions to the virtual conference over time. For example, each type of reaction (e.g., applause, laughter, etc.) is plotted as a respective line based on the number of corresponding reactions over the duration of the virtual conference. Each line may be a different color to represent a respective reaction. In this manner, the timeline represents different reactions over time, so that the viewing user (e.g., administrator) is able to visualize the times during the virtual conference that caused a reaction, and what those specific reactions were. The virtual space navigation interface 208 for the first participant may include an interface element which is selectable to view the timeline, while not including such an interface element for the second participant(s).

In response to user selection by the first participant (e.g., administrator) to view the graphical overview (e.g., timeline), the virtual conference server system 108 provides for display of the timeline on the first client device 602 (operation 628). In one or more embodiments, the virtual conference server system 108 provides for times presented within the timeline (e.g., the x-axis corresponding to time) to be user-selectable to initiate playback of the recording of the virtual conference at the selected point in time. In this manner, in viewing the time(s) during the virtual conference that caused reaction(s), the first participant may select to playback the corresponding video/audio at that time.

Thus, the virtual conferencing system 100 as described herein provides for increased user engagement with respect to participating in a virtual conference, from either the role of a presenter or the role of an attendee. Moreover, by virtue of including reaction interfaces (e.g., reaction buttons/icons) as described herein, the virtual conferencing system 100 facilitates participant feedback. Without such reaction interfaces, participants (e.g., attendees) may otherwise be required to manually provide comments to a presenter, and such comments may not be viewable in real-time. Moreover, the graphical overview (e.g., timeline of reactions over time) provides a form of feedback to the presenter that is made possible by such reaction interfaces.

Figure 7:
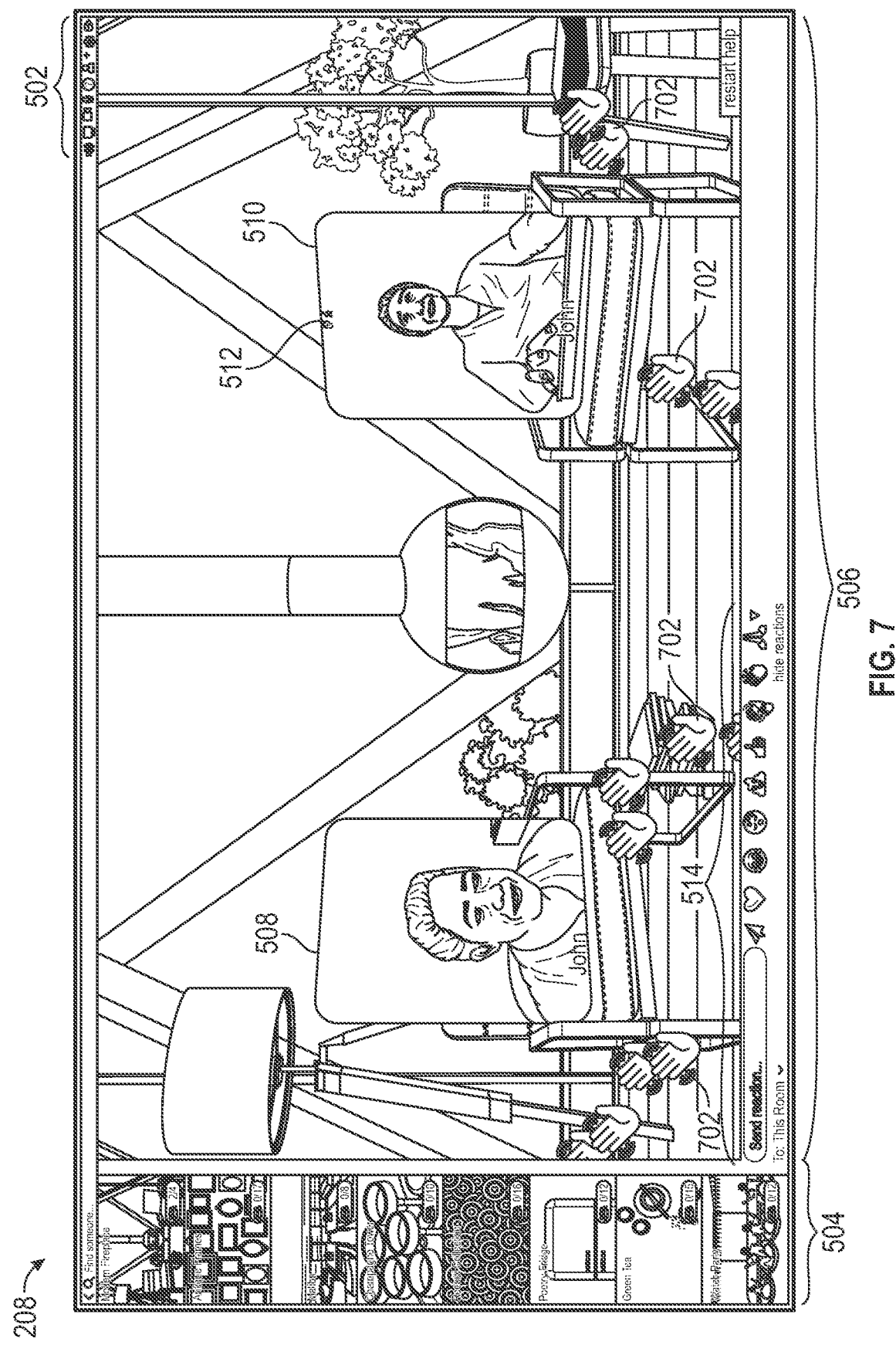
FIG. 7 illustrates a virtual space navigation interface with reaction icons indicating reactions by participants of a virtual conference, in accordance with some example embodiments.

FIG. 7 illustrates the virtual space navigation interface 208 of FIG. 5 with reaction icons indicating reactions by participants of a virtual conference, in accordance with some example embodiments. As noted above, the virtual space navigation interface 208 provides one or more user-selectable reaction buttons (e.g., via the reactions interface 514) for indicating different reactions to a virtual conference. One example reaction button is the applause button included in the reactions interface 514.

The virtual space navigation interface 208 further displays reaction icons 702 that use the same image as, or are otherwise similar to, the reaction buttons within the reactions interface 514. In the example of FIG. 7, the reaction icons are depicted as clapping hands, using the same image as (e.g., but larger in size than) the applause button included in the reactions interface 514. As discussed above with respect to FIG. 6, each of the reaction icons 702 may correspond to a single button press of the applause button in the reactions interface 514 (e.g., from one or more participants of the virtual teleconference). Further, each of the reaction icons 702 is presented as starting from a bottom edge of the screen (e.g., with different icons starting at different positions along the bottom edge), traveling/floating upwards for a predefined distance from the bottom edge, and disappearing after traveling the predefined distance.

As noted above, the virtual conferencing system 100 is configured to modify display of the reaction icons 702, with supplemental reaction images (e.g., an animation of confetti, fireworks), in a case where the rate at which the reactions are received from participants meets threshold rate(s). In addition, the virtual conferencing system 100 is configured to modify audio output associated with display of the reaction icons 702 when threshold rate(s) are met.

Figure 8:
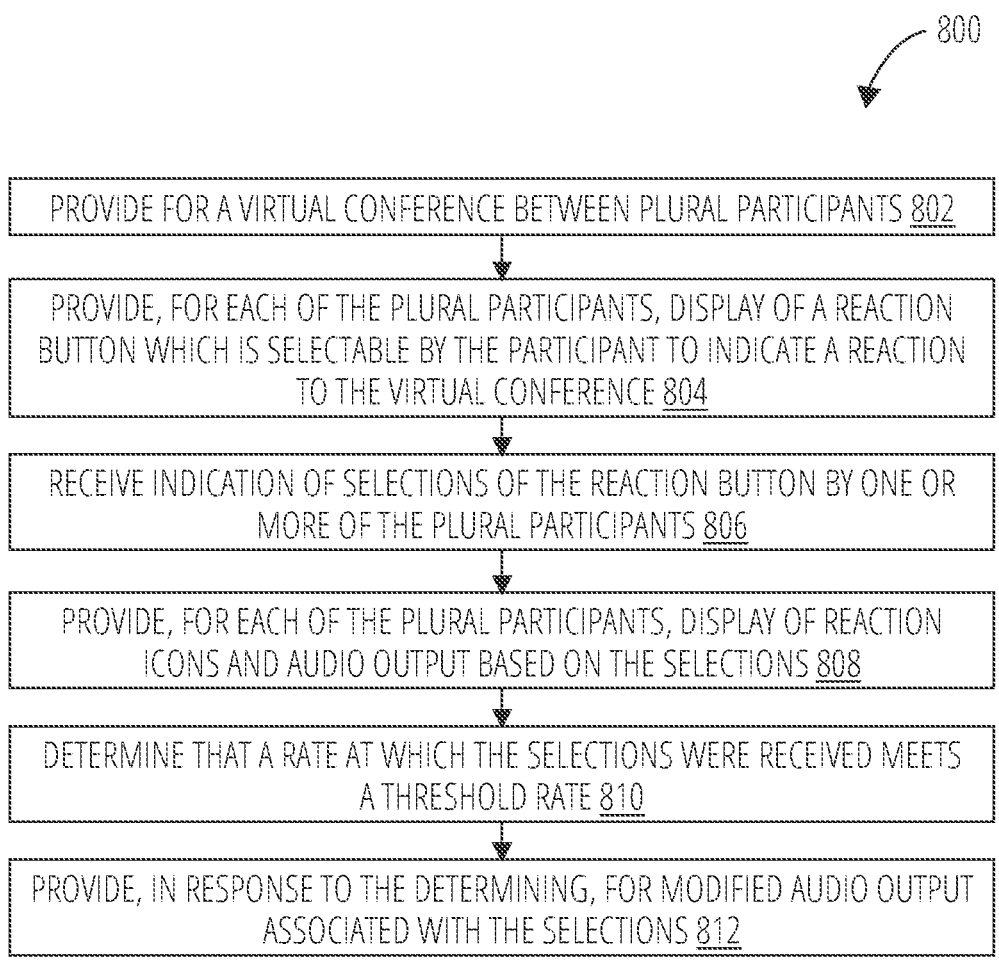
FIG. 8 is a flowchart illustrating a process for presenting participant reactions within a virtual conferencing system, in accordance with some example embodiments.

FIG. 8 is a flowchart illustrating a process 800 for presenting participant reactions within a virtual conferencing system, in accordance with some example embodiments. For explanatory purposes, the process 800 is primarily described herein with reference to the first client device 602, the second client device(s) 604 and the virtual conference server system 108 of FIG. 1 and FIG. 2. However, one or more blocks (or operations) of the process 800 may be performed by one or more other components, and/or by other suitable devices. Further for explanatory purposes, the blocks (or operations) of the process 800 are described herein as occurring in serial, or linearly. However, multiple blocks (or operations) of the process 800 may occur in parallel or concurrently. In addition, the blocks (or operations) of the process 800 need not be performed in the order shown and/or one or more blocks (or operations) of the process 800 need not be performed and/or can be replaced by other operations. The process 800 may be terminated when its operations are completed. In addition, the process 800 may correspond to a method, a procedure, an algorithm, etc.

The virtual conference server system 108 provides for a virtual conference between plural participants (block 802). The virtual conference may be provided within a room of plural rooms, the plural rooms being included within a virtual space for virtual conferencing. The virtual conference server system 108 may provide, for each of the plural participants, display of a participant video element which corresponds to the participant and which includes a video feed for the participant.

The virtual conference server system 108 provides, for each of the plural participants, display of a reaction button which is selectable by the participant to indicate a reaction to the virtual conference (block 804). The reaction button may correspond to an applause button to indicate applause with respect to the virtual conference. The virtual conference server system 108 receives indication of selections of the reaction button by one or more of the plural participants (block 806).

The virtual conference server system 108 provides, for each of the plural participants, display of reaction icons and audio output based on the selections (block 808). Providing the audio output may include causing playback of a first audio file multiple times based on a number of the selections. The virtual conference server system 108 determines that a rate at which the selections were received meets a threshold rate (block 810).

The virtual conference server system 108 provides, in response to the determining, for modified audio output associated with the selections (block 812). Providing the modified audio output may include causing playback of a second audio file a single time based on determining that the rate meets the threshold rate. Playback of the second audio file may correspond with increased intensity of the reaction relative to playback of the first audio file.

The virtual conference server system 108 may determine that the rate at which the selections were received meets a second threshold rate, and provide, in response to determining that the rate meets the second threshold rate, for second modified audio output associated with the selections.

Figure 9:
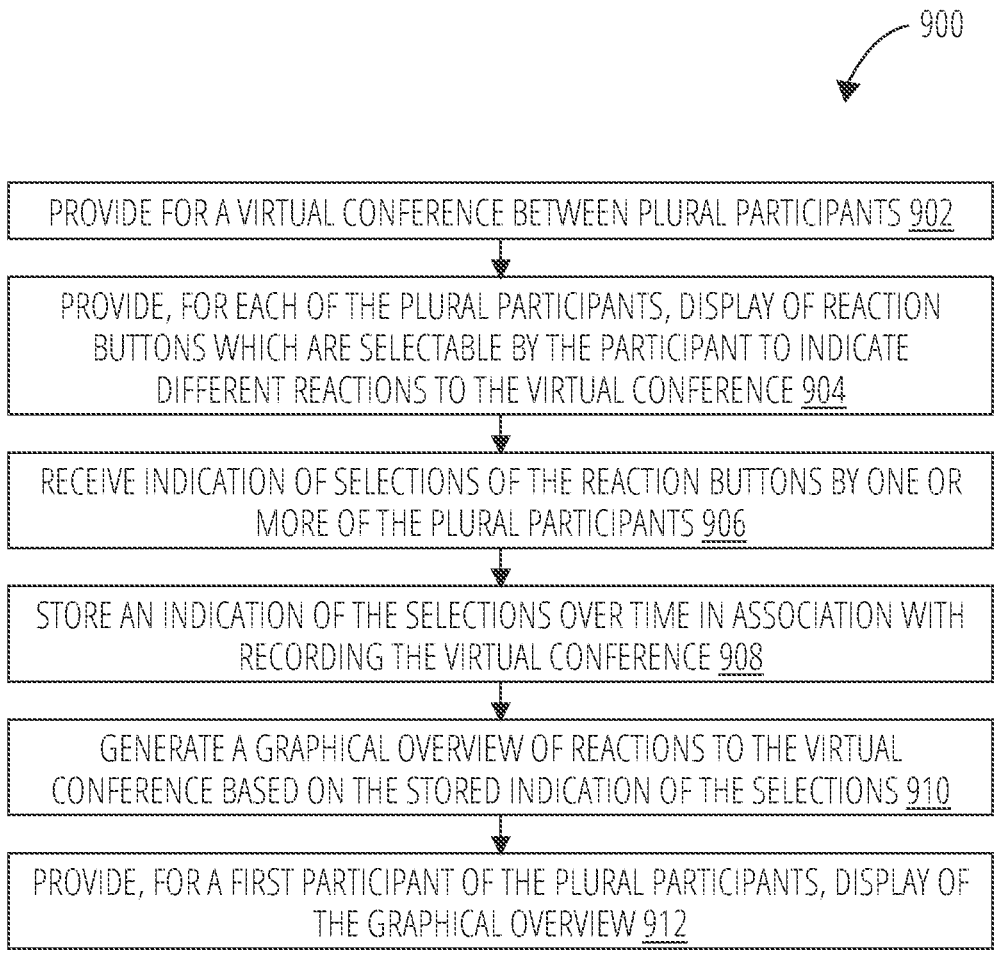
FIG. 9 is a flowchart illustrating a process for presenting a graphical overview of participant reactions within a virtual conferencing system, in accordance with some example embodiments.

FIG. 9 is a flowchart illustrating a process 900 for presenting a graphical overview of participant reactions within a virtual conferencing system, in accordance with some example embodiments. For explanatory purposes, the process 800 is primarily described herein with reference to the first client device 602, the second client device(s) 604 and the virtual conference server system 108 of FIG. 1 and FIG. 2. However, one or more blocks (or operations) of the process 800 may be performed by one or more other components, and/or by other suitable devices. Further for explanatory purposes, the blocks (or operations) of the process 800 are described herein as occurring in serial, or linearly. However, multiple blocks (or operations) of the process 800 may occur in parallel or concurrently. In addition, the blocks (or operations) of the process 800 need not be performed in the order shown and/or one or more blocks (or operations) of the process 800 need not be performed and/or can be replaced by other operations. The process 800 may be terminated when its operations are completed. In addition, the process 800 may correspond to a method, a procedure, an algorithm, etc.

The virtual conference server system 108 provides for a virtual conference between plural participants (block 902). The first participant may correspond to a presenter of the virtual conference, and the remaining participants to attendees of the virtual conference.

The virtual conference may be provided within a room of plural rooms, the plural rooms being included within a virtual space for virtual conferencing. The virtual conference server system 108 may provide, for each of the plural participants, display of a participant video element which corresponds to the participant and which includes a video feed for the participant.

The virtual conference server system 108 provides, for each of the plural participants, display of reaction buttons which are selectable by the participant to indicate different reactions to the virtual conference (block 904). The different reactions may include two or more of applauding, laughing, agreeing, disagreeing and feeling happy, each of which is indicated by one of the reaction buttons.

The virtual conference server system 108 receives indication of selections of the reaction buttons by one or more of the plural participants (block 906). The virtual conference server system 108 stores an indication of the selections over time in association with recording the virtual conference (block 908).

The virtual conference server system 108 generates a graphical overview of reactions to the virtual conference based on the stored indication of the selections (block 910). The graphical overview may be a timeline indicating the different reactions to the virtual conference over time. The timeline may be user-selectable to initiate playback of the recording of the virtual conference at a user-selected point in time.

The virtual conference server system 108 provides, for a first participant of the plural participants, display of the graphical overview (block 912). The virtual conference server system 108 may refrain from displaying the graphical overview to remaining participants of the plural participants.

Figure 10:
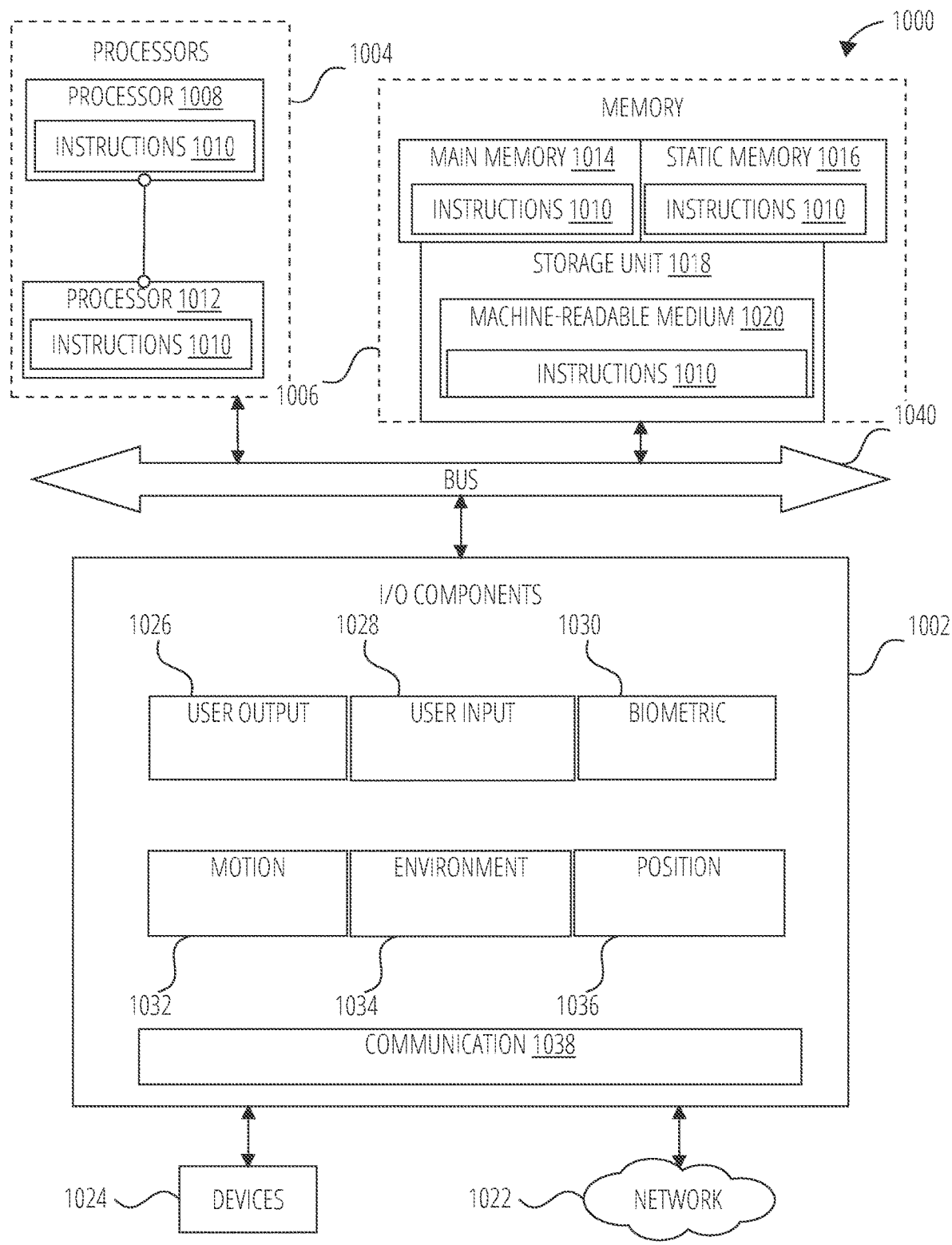
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of the machine 1000 within which instructions 1010 (e.g., software, a program, an application, an applet, an app, or other executable code) for causing the machine 1000 to perform any one or more of the methodologies discussed herein may be executed. For example, the instructions 1010 may cause the machine 1000 to execute any one or more of the methods described herein. The instructions 1010 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1010, sequentially or otherwise, that specify actions to be taken by the machine 1000. Further, while only a single machine 1000 is illustrated, the term "machine" shall also be taken to include a collection of machines that individually or jointly execute the instructions 1010 to perform any one or more of the methodologies discussed herein. The machine 1000, for example, may comprise the client device 102 or any one of a number of server devices forming part of the virtual conference server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1004, memory 1006, and input/output I/O components 1002, which may be configured to communicate with each other via a bus 1040. In an example, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1008 and a processor 1012 that execute the instructions 1010. The term "processor" is intended to include multi-core processors that may comprise two or more independent processors (sometimes referred to as "cores") that may execute instructions contemporaneously. Although FIG. 10 shows multiple processors 1004, the machine 1000 may include a single processor with a single-core, a single processor with multiple cores (e.g., a multi-core processor), multiple processors with a single core, multiple processors with multiples cores, or any combination thereof.

The memory 1006 includes a main memory 1014, a static memory 1016, and a storage unit 1018, both accessible to the processors 1004 via the bus 1040. The main memory 1006, the static memory 1016, and storage unit 1018 store the instructions 1010 embodying any one or more of the methodologies or functions described herein. The instructions 1010 may also reside, completely or partially, within the main memory 1014, within the static memory 1016, within machine-readable medium 1020 within the storage unit 1018, within at least one of the processors 1004 (e.g., within the Processor's cache memory), or any suitable combination thereof, during execution thereof by the machine 1000.

The I/O components 1002 may include a wide variety of components to receive input, provide output, produce output, transmit information, exchange information, capture measurements, and so on. The specific I/O components 1002 that are included in a particular machine will depend on the type of machine. For example, portable machines such as mobile phones may include a touch input device or other such input mechanisms, while a headless server machine will likely not include such a touch input device. It will be appreciated that the I/O components 1002 may include many other components that are not shown in FIG. 10. In various examples, the I/O components 1002 may include user output components 1026 and user input components 1028. The user output components 1026 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1002 may include biometric components 1030, motion components 1032, environmental components 1034, or position components 1036, among a wide array of other components. For example, the biometric components 1030 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1032 include acceleration sensor components (e.g., accelerometer), gravitation sensor components, rotation sensor components (e.g., gyroscope).

The environmental components 1034 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1036 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1002 further include communication components 1038 operable to couple the machine 1000 to a network 1022 or devices 1024 via respective coupling or connections. For example, the communication components 1038 may include a network interface Component or another suitable device to interface with the network 1022. In further examples, the communication components 1038 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1024 may be another machine or any of a wide variety of peripheral devices (e.g., a peripheral device coupled via a USB).

Moreover, the communication components 1038 may detect identifiers or include components operable to detect identifiers. For example, the communication components 1038 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1038, such as location via Internet Protocol (IP) geolocation, location via Wi-Fi® signal triangulation, location via detecting an NFC beacon signal that may indicate a particular location, and so forth.

The various memories (e.g., main memory 1014, static memory 1016, and memory of the processors 1004) and storage unit 1018 may store one or more sets of instructions and data structures (e.g., software) embodying or used by any one or more of the methodologies or functions described herein. These instructions (e.g., the instructions 1010), when executed by processors 1004, cause various operations to implement the disclosed examples.

The instructions 1010 may be transmitted or received over the network 1022, using a transmission medium, via a network interface device (e.g., a network interface component included in the communication components 1038) and using any one of several well-known transfer protocols (e.g., hypertext transfer protocol (HTTP)). Similarly, the instructions 1010 may be transmitted or received using a transmission medium via a coupling (e.g., a peer-to-peer coupling) to the devices 1024.

Figure 11:
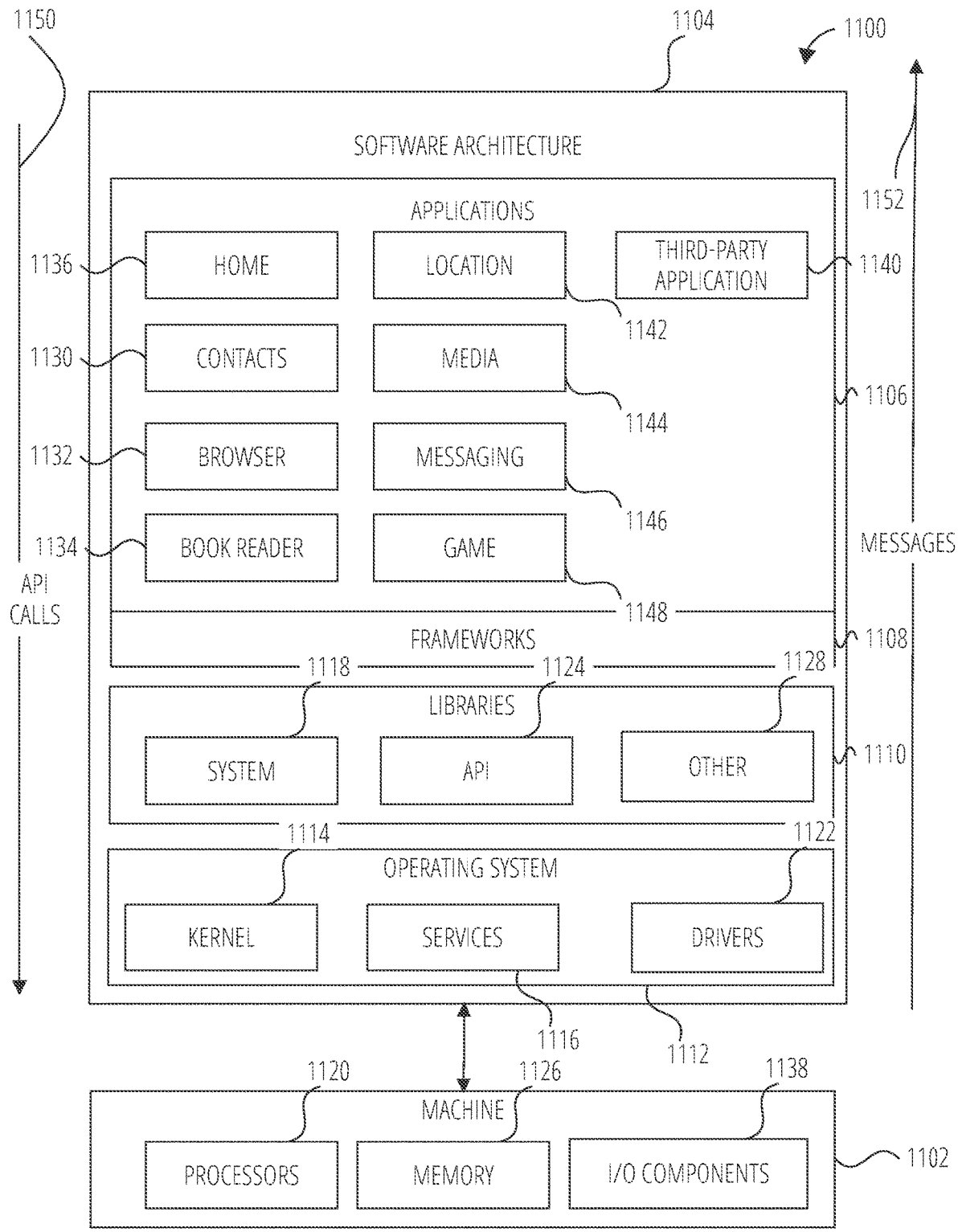
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as a third-party application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the third-party application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1140 can invoke the API calls 1150 provided by the operating system 1112 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, comprising:
providing for a virtual conference between plural participants;
providing, for each of the plural participants, display of a reaction button which is selectable by the participant to indicate a reaction to the virtual conference;
receiving indication of selections of the reaction button by one or more of the plural participants; and
in response to receiving the indication,
providing, for each of the plural participants, display of reaction icons based on the selections,
determining that a rate at which the selections were received meets a threshold rate, and
providing, in response to the determining, for display of supplemental images which are separate from the reaction icons and which are associated with the selections.

2. The method of claim 1, wherein the reaction icons comprise clapping hands.

3. The method of claim 2, wherein the supplemental images comprise confetti displayed together with the clapping hands.

4. The method of claim 2, wherein the supplemental images comprise fireworks displayed together with the clapping hands.

5. The method of claim 1, further comprising:
determining that the rate at which the selections were received meets a second threshold rate, and
providing, in response to determining that the rate meets the second threshold rate, for modified display of the supplemental images.

6. The method of claim 1, wherein the reaction button corresponds to an applause button to indicate applause with respect to the virtual conference.

7. The method of claim 1, wherein the virtual conference is provided within a room of plural rooms, the plural rooms being included within a virtual space for virtual conferencing.

8. The method of claim 1, further comprising:
providing, for each of the plural participants, display of a participant video element which corresponds to the participant and which includes a video feed for the participant.

9. A system comprising:
a processor; and
a memory storing instructions that, when executed by the processor, configure the processor to perform operations comprising:
providing for a virtual conference between plural participants;
providing, for each of the plural participants, display of a reaction button which is selectable by the participant to indicate a reaction to the virtual conference;
receiving indication of selections of the reaction button by one or more of the plural participants; and
in response to receiving the indication,
providing, for each of the plural participants, display of reaction icons based on the selections,
determining that a rate at which the selections were received meets a threshold rate, and
providing, in response to the determining, for display of supplemental images which are separate from the reaction icons and which are associated with the selections.

10. The system of claim 9, wherein the reaction icons comprise clapping hands.

11. The system of claim 10, wherein the supplemental images comprise confetti displayed together with the clapping hands.

12. The system of claim 11, wherein the supplemental images comprise fireworks displayed together with the clapping hands.

13. The system of claim 9, the operations further comprising:
determining that the rate at which the selections were received meets a second threshold rate, and
providing, in response to determining that the rate meets the second threshold rate, for modified display of the supplemental images.

14. The system of claim 9, wherein the reaction button corresponds to an applause button to indicate applause with respect to the virtual conference.

15. The system of claim 9, wherein the virtual conference is provided within a room of plural rooms, the plural rooms being included within a virtual space for virtual conferencing.

16. The system of claim 9, the operations further comprising:
providing, for each of the plural participants, display of a participant video element which corresponds to the participant and which includes a video feed for the participant.

17. A non-transitory computer-readable storage medium, the computer-readable storage medium including instructions that when executed by a computer, cause the computer to perform operations comprising:
providing for a virtual conference between plural participants;
providing, for each of the plural participants, display of a reaction button which is selectable by the participant to indicate a reaction to the virtual conference;
receiving indication of selections of the reaction button by one or more of the plural participants; and
in response to receiving the indication,
providing, for each of the plural participants, display of reaction icons based on the selections,
determining that a rate at which the selections were received meets a threshold rate, and
providing, in response to the determining, for display of supplemental images which are separate from the reaction icons and which are associated with the selections.

18. The computer-readable medium of claim 17, wherein the reaction icons comprise clapping hands.

19. The computer-readable medium of claim 18, wherein the supplemental images comprise confetti displayed together with the clapping hands.

20. The computer-readable medium of claim 19, wherein the supplemental images comprise fireworks displayed together with the clapping hands.

\* \* \* \* \*